(12) United States Patent
Sibley et al.

(10) Patent No.: US 12,258,999 B2
(45) Date of Patent: Mar. 25, 2025

(54) SECURING DEVICES

(71) Applicant: ARRIS Enterprises LLC, Suwanee, GA (US)

(72) Inventors: Keith E. Sibley, North Wales, PA (US); Jamie J. Swift, Levittown, PA (US); David Bowler, Stow, MA (US); Julio Cesar Ayala Vera, Apodaca (MX)

(73) Assignee: ARRIS Enterprises LLC, Suwanee, GA (US)

( * ) Notice: Subject to any disclaimer, the term of this patent is extended or adjusted under 35 U.S.C. 154(b) by 13 days.

(21) Appl. No.: 17/900,764

(22) Filed: Aug. 31, 2022

(65) Prior Publication Data

US 2023/0071701 A1 Mar. 9, 2023

Related U.S. Application Data

(60) Provisional application No. 63/240,711, filed on Sep. 3, 2021.

(51) Int. Cl.
*F16B 9/02* (2006.01)
*B65D 25/20* (2006.01)

(52) U.S. Cl.
CPC .............. *F16B 9/02* (2013.01); *B65D 25/20* (2013.01)

(58) Field of Classification Search
CPC .............. F16B 9/02; F16B 2/12; B65D 25/20
USPC ............ 269/2, 47, 87.2; 248/229.12, 229.14, 248/229.2, 229.22, 228.3
See application file for complete search history.

(56) References Cited

U.S. PATENT DOCUMENTS

| | | | | |
|---|---|---|---|---|
| 454,693 | A * | 6/1891 | Wies | B25B 1/08 269/200 |
| 472,010 | A * | 3/1892 | Cash | B25B 1/125 269/140 |
| 1,955,933 | A * | 4/1934 | Roesner | B41F 27/10 101/387 |
| 5,584,457 | A * | 12/1996 | Fawcett | F21V 23/04 362/802 |
| 5,806,735 | A * | 9/1998 | Christiansson | B60R 9/045 224/322 |
| 5,996,736 | A * | 12/1999 | Stankiewicz | B60R 9/0485 182/127 |
| 6,948,877 | B1 * | 9/2005 | Lo | F16B 7/04 248/229.12 |
| 8,950,716 | B2 * | 2/2015 | Kempf | B66D 3/26 248/229.23 |
| 10,018,208 | B2 * | 7/2018 | Hollis | F16B 2/065 |
| 10,307,892 | B1 * | 6/2019 | Schaefer | B25B 1/103 |
| 10,543,771 | B2 * | 1/2020 | Sautter | B60P 3/34 |
| 10,773,362 | B2 * | 9/2020 | Howard | B25B 5/10 |
| 2006/0055098 | A1 * | 3/2006 | Siegel | B25B 1/2452 269/279 |

(Continued)

*Primary Examiner* — Muhammad Ijaz
(74) *Attorney, Agent, or Firm* — Chernoff, Vilhauer, McClung & Stenzel, LLP

(57) ABSTRACT

Securing devices are shown and disclosed. In one embodiment, the securing device includes a base having a first channel. The securing device additionally includes a pair of clamp members received in the first channel. The securing device further includes an actuator member that is received in the first channel and that enables a user to simultaneously move the pair of clamp members toward or away from each other.

18 Claims, 5 Drawing Sheets

(56) References Cited

U.S. PATENT DOCUMENTS

| | | | | |
|---|---|---|---|---|
| 2008/0116333 | A1* | 5/2008 | Chang | G09F 7/205 248/200.1 |
| 2011/0198466 | A1* | 8/2011 | Lloyd, III | B66B 31/00 248/229.12 |
| 2011/0280651 | A1* | 11/2011 | Chiang | F16B 2/12 403/322.4 |
| 2014/0014797 | A1* | 1/2014 | McSherry | F16B 2/12 248/231.41 |
| 2017/0324228 | A1* | 11/2017 | Garcia | F16B 2/241 |
| 2023/0071701 | A1* | 3/2023 | Sibley | F16B 2/12 |

* cited by examiner

SECURING DEVICES

CROSS REFERENCE TO RELATED APPLICATIONS

This application claims the benefit of U.S. Provisional Patent Application Ser. No. 63/240,711 filed Sep. 3, 2021.

BACKGROUND

The subject matter of this application relates to securing devices for securing equipment, such as containers, other enclosures, and non-enclosure structures, to cables (e.g., power lines, fiber optic cable, etc.). The installation and repair of cable and/or power lines require personnel to work at hazardous heights and in close proximity to those cables and/or power lines. Additionally, personnel at those heights generally carry only simple handheld tools (e.g., socket wrenches, other wrenches, etc.).

What is desired, therefore, are securing devices that secure equipment to cable using only simple handheld tools and that reduce the time necessary for personnel to be in proximity to the cable.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
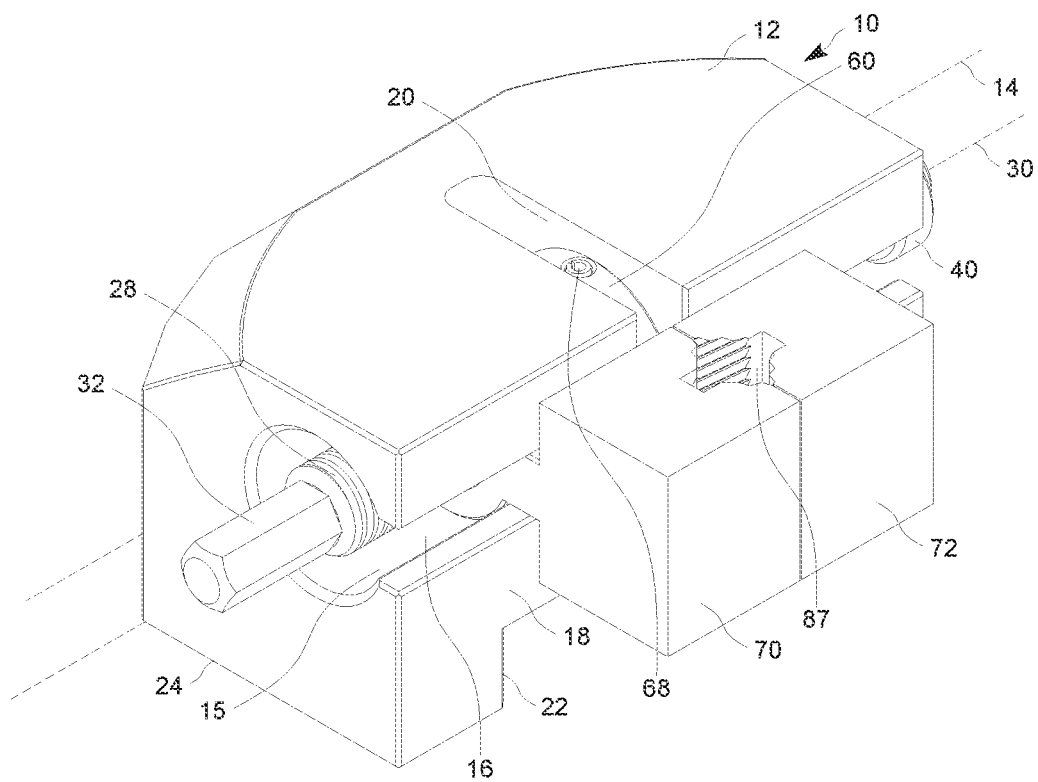
FIG. 1 is an isometric view of an example of a securing device shown with clamps in a first position.
Figure 2:
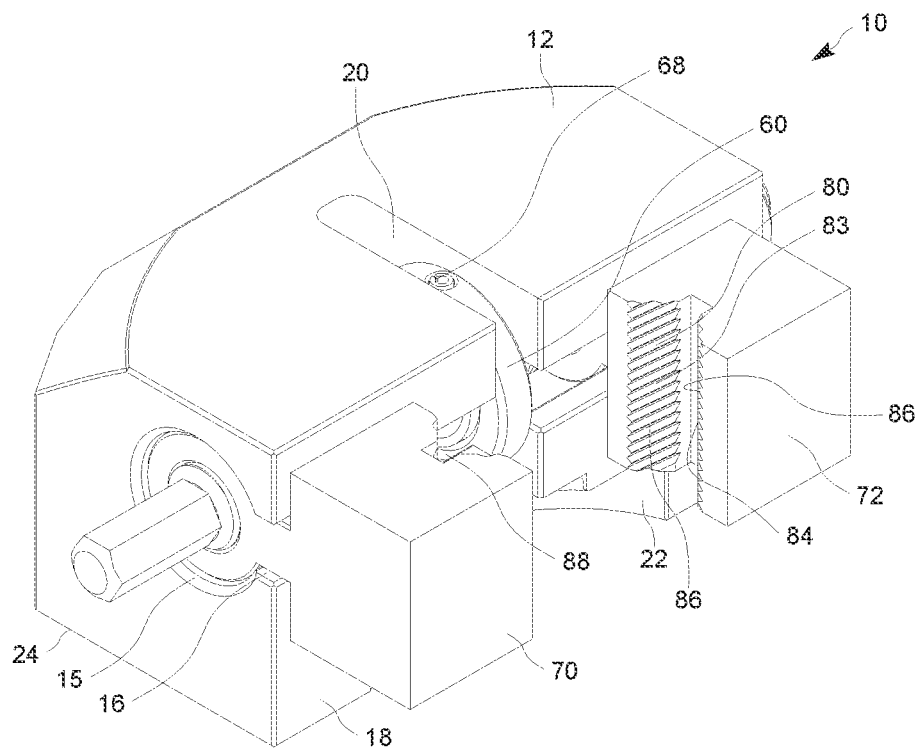
FIG. 2 is an isometric view of an example of the securing device of FIG. 1 shown with the clamps in a second position.
Figure 3:
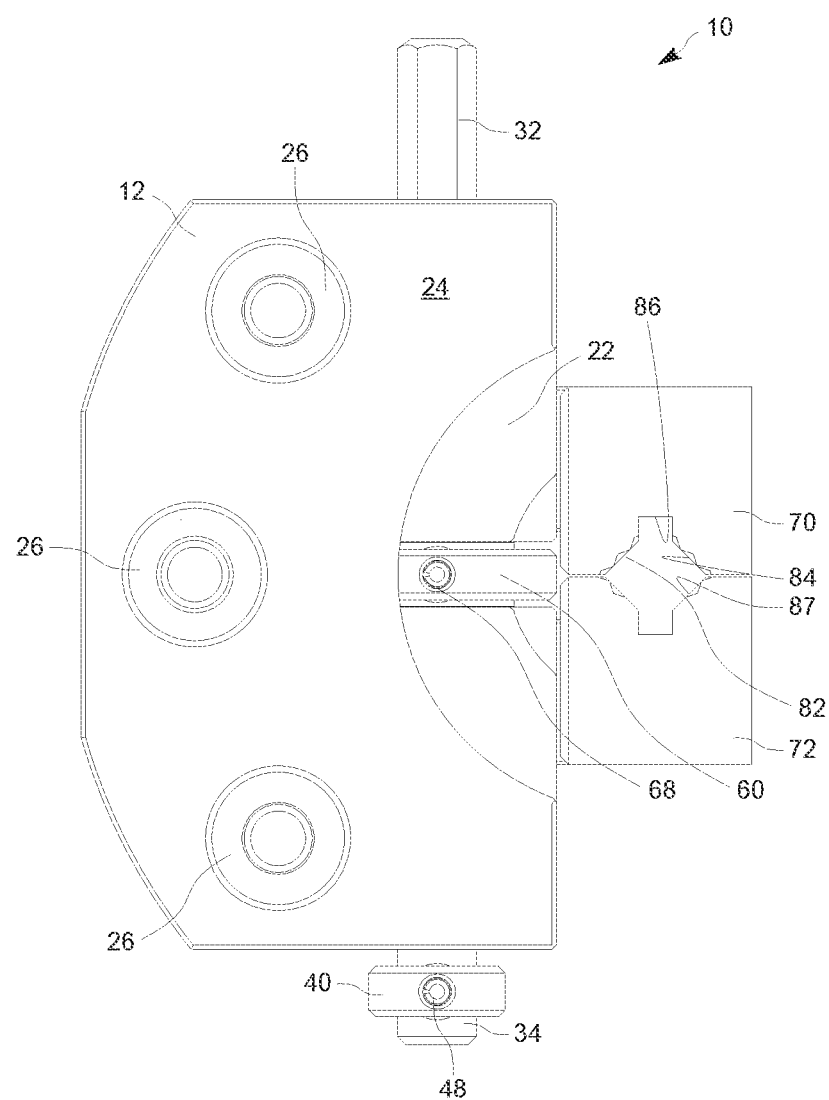
FIG. 3 is a bottom view of the securing device of FIG. 1.
Figure 4:
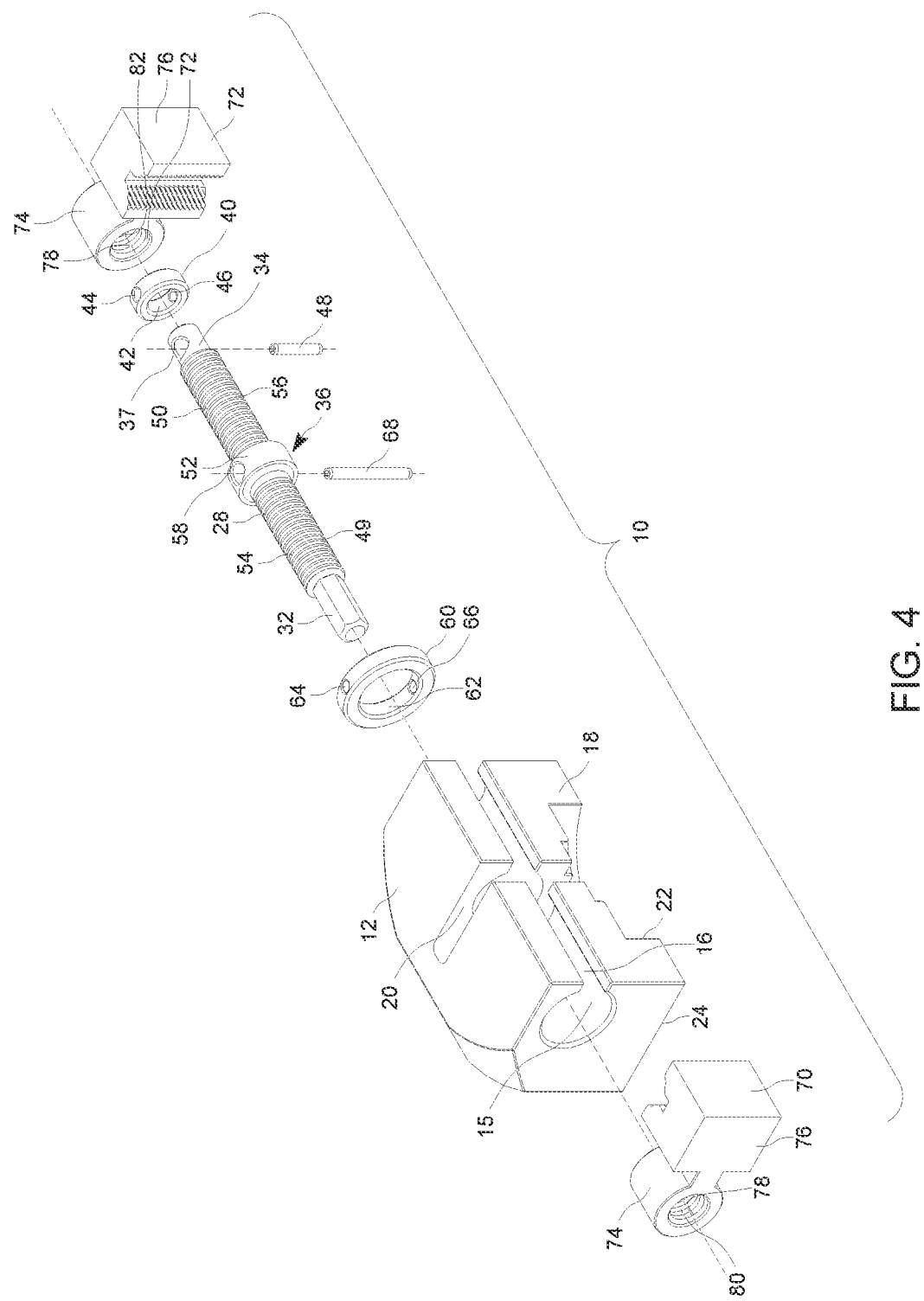
FIG. 4 is an exploded view of the securing device of FIG. 1.

Referring to FIGS. 1-4, an example of a securing device 10 is shown. The securing device includes a base 12 defining a longitudinal axis 14. The base includes a main channel 15 that is along the length of base 12 or along longitudinal axis 14 (or has an axis that is parallel and/or co-axial to longitudinal axis 14). In the example shown in FIGS. 1-4, main channel 15 is at least substantially cylindrical. Base 12 also includes an access opening 16 connected to or in fluid communication with the main channel along a front portion 18 of base 12. The access opening is along or substantially along the length of base 12 and has a width that is substantially smaller than the width or diameter of the main channel. In other embodiments, the access opening may run along less than the entire length of base 12. For example, access opening 16 may run along a substantial portion of the length except at both ends, which may provide stops for clamp members of securing device 10.

Base 12 additionally includes a central channel 20 that is connected to or in fluid communication with main channel 15. In the example shown in FIGS. 1-4, the central channel is perpendicular to main channel 15 and is along the height of base 12. The base further includes a cavity 22 along a bottom surface 24. The cavity is shaped and sized to receive a portion of a connector to allow the securing device to be flush or substantially flush with one or more structures, as further discussed below. Base 12 additionally includes one or more holes 26 along the height of the base. Each of holes 26 define an axis that is perpendicular to longitudinal axis 14. The holes are sized to receive fasteners to attach securing device to one or more structures, as further discussed below. In the example shown in FIGS. 1-4, holes 26 are countersunk holes to at least partially receive heads of the fasteners. In some examples, holes 26 may include threads that correspond to threads of fasteners.

Securing device 10 additionally includes an actuator member or actuator shaft 28 received in main channel 15. The actuator shaft defines a shaft longitudinal axis 30. Actuator shaft 28 includes opposed first and second end portions 32 and 34 and a central portion 36 disposed between the first and second end portions. In the example shown in FIGS. 1-4, first end portion 32 has a hex shape to allow a user to use a simple handheld tool, such as a socket wrench, to rotate actuator shaft 28. Second end portion 34 includes an end pin aperture 37 having an axis 38 that is perpendicular to longitudinal axis 14.

Securing device 10 further includes an end retainer ring or an end retainer collar 40 having an end collar opening 42 that receives second end portion 32. The end retainer collar includes opposed side openings 44 and 46. An end retainer pin 48 is received in end pin aperture 37 of second end portion 34 of actuator shaft 28 and side openings 44 and 46 of end retainer collar 40 to secure end retainer collar 40 to actuator shaft 28. The end retainer collar is sized to prevent clamp members from being moved off or removed from the actuator shaft. Although securing device 10 is shown to include end retainer collar 40, other embodiments of the securing device 10 may exclude the end retainer collar. In at least some of those embodiments, end retainer pin 48 may be sized to prevent the clamp members from being moved off or removed from the actuator shaft.

Central portion 36 of actuator shaft 28 includes opposed threaded portions 49 and 50 and a spacer portion or an enlarged diameter portion 52 disposed between those threaded portions. Threaded portion 49 includes left-handed threads 54, while threaded portion 50 includes right-handed threads 56. In some embodiments, central portion 36 may serve as a stop to prevent clamp members from moving further toward each other. In the examples shown in FIGS. 1-4, spacer portion 52 has a diameter that is larger than the diameter of threaded portions 49 and/or 50. However, other embodiments of spacer portion 52 may have the same diameter as those threaded portions. The spacer portion includes a central pin aperture 58 that includes an axis that is perpendicular to shaft longitudinal axis 30.

Securing device 10 additionally includes a central retainer ring or a central retainer collar 60 having a central collar opening 62 that receives spacer portion 50 of actuator shaft 28. The central retainer collar is sized to be received in central channel 20 of base 12. Central retainer collar 60 includes opposed side openings 64 and 66. A central retainer pin 68 is received in central pin aperture 58 of central portion 36 of actuator shaft 28 and opposed side openings 64 and 66 of central retainer collar 60 to secure actuator shaft 28 to base 12. In other words, central retainer pin 68 prevents actuator shaft 28 from moving longitudinally relative to base 12 to prevent removal of the actuator shaft. Although securing device 10 is shown to include central retainer collar 60, other embodiments of the securing device may exclude the central retainer collar. In at least some of those embodiments, central retainer pin 68 may be received in one or more apertures (not shown) of base 12 to secure the actuator shaft to the base.

Securing device 10 further includes clamp members 70 and 72, which are movably or slidably connected to base 12 via actuator shaft 28. The clamp members each includes a loop portion 74 and a clamp portion 76. Loop portion 74 includes a clamp opening 78 that receives threaded portion 49. The clamp opening of clamp member 70 includes threads 80 that correspond with left-handed threads 54 of threaded portion 49. Similarly, clamp opening 78 of clamp member 72 includes threads 82 that correspond with right-handed threads 56 of threaded portion 50. Threads 80 and 82 allow a user to move clamp members 70 and 72 toward or away from each other by rotating actuator shaft 28, such as via rotating first end portion 32 using a simple hand tool. For example, rotation of the actuator shaft in a clockwise direction moves clamp members 70 and 72 toward each other, while rotation of the actuator shaft in a counter-clockwise direction moves clamp members 70 and 72 away from each other.

Clamp portion 76 of each of clamp members 70 and 72 includes one or more clamping surfaces 80 that face toward the clamping surfaces of the other clamp member. In the example shown in FIGS. 1-4, clamp surfaces 80 includes opposed inclined clamping surfaces 83 and 84 each having ridges 86 with a notch 88 disposed between the inclined clamping surfaces. The clamping surfaces and its ridges are sized and shaped to form an opening 87 between clamp portion 76 of clamp members 70 and 72 to secure a cable in that opening, which secures the cable to securing device 10. Clamp portion 76 of each of clamp members 70 and 72 may be any suitable shape and/or size. In the example shown in FIGS. 1-4, clamp portion 76 is generally cube- or cuboid-shaped with one of the sides having the above opposed inclined clamping surfaces.

Figure 5:
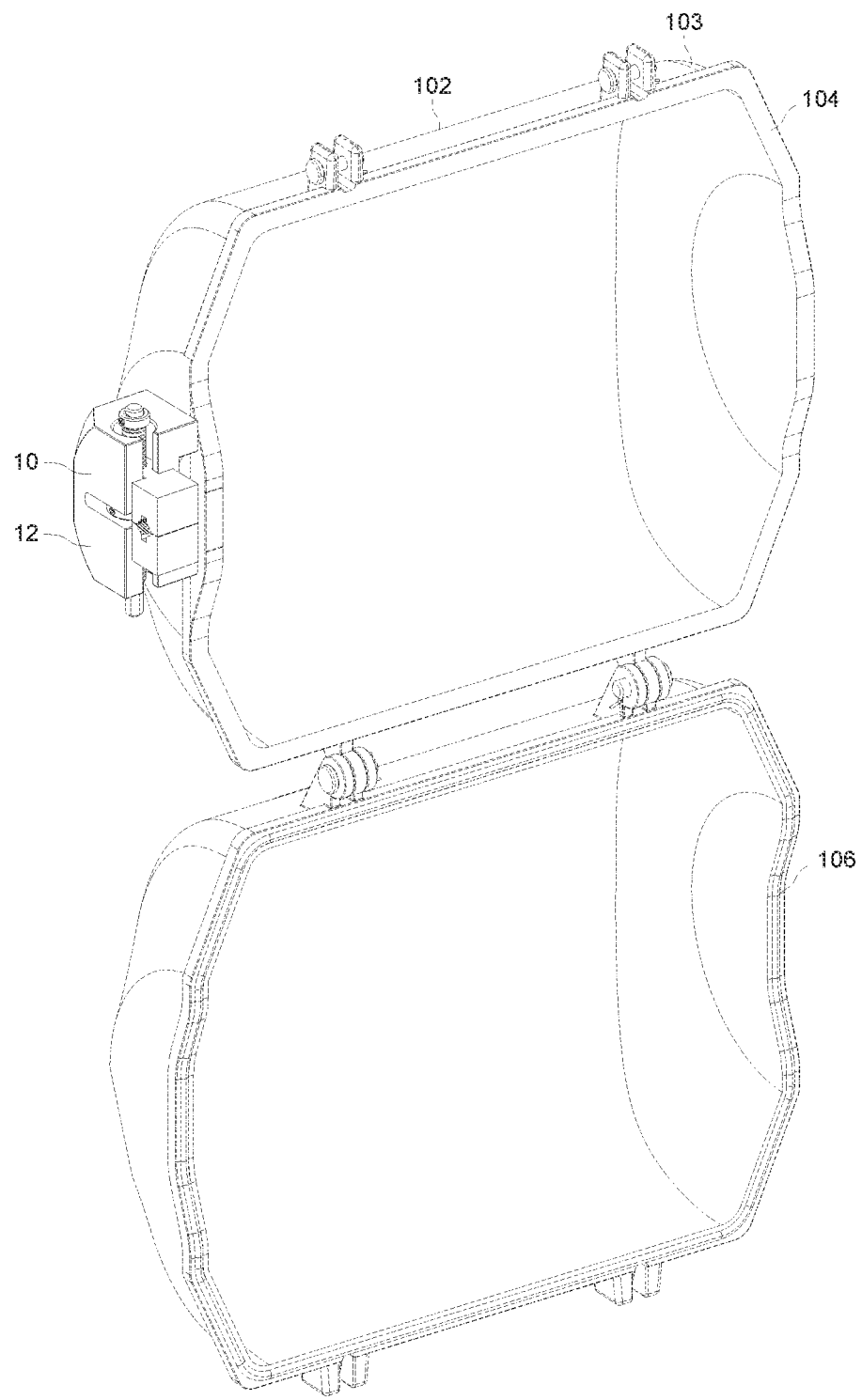
FIG. 5 is an isometric view of an example of a cable enclosure having the securing device of FIG. 1.
Figure 6:
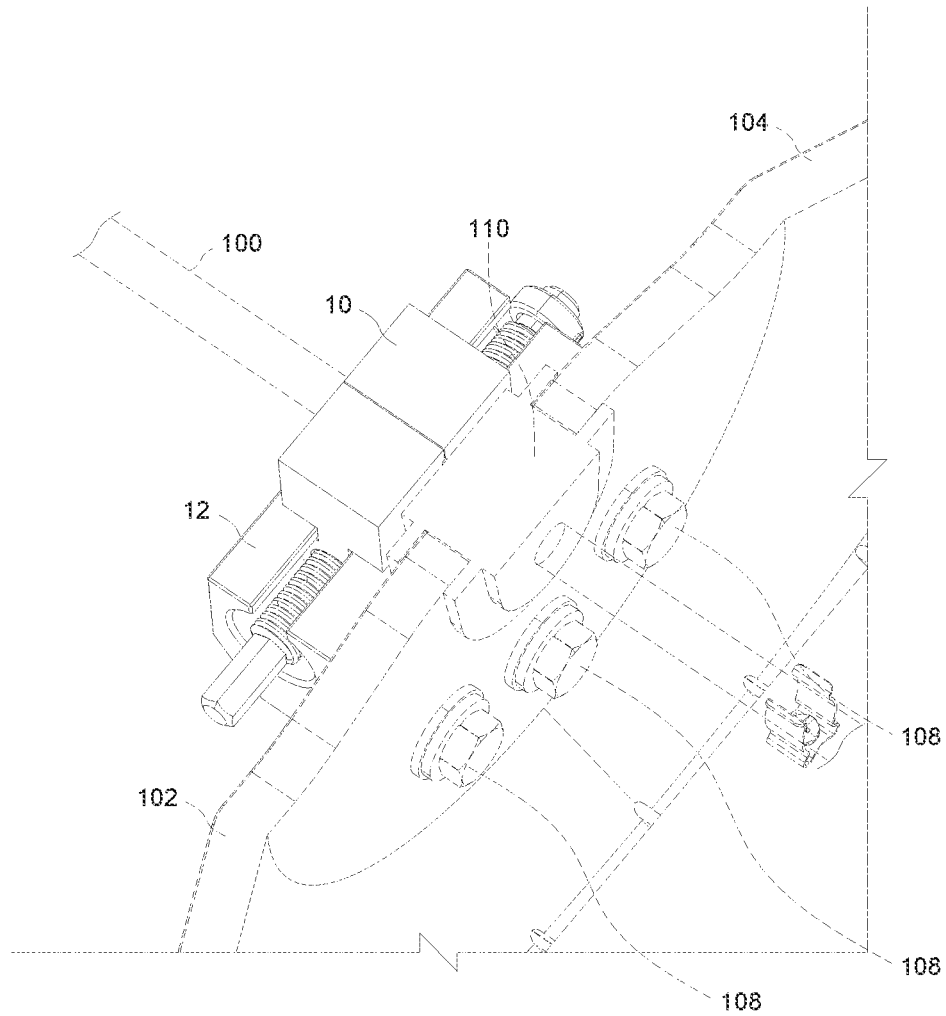
FIG. 6 is a partial isometric view of the example of the cable enclosure of FIG. 5.

Referring to FIGS. 5-6, securing device 10 may be used to secure one or more cables 100 to one or more structures 102. In the example shown in FIGS. 5-6, structure 102 is a container 103 having a first enclosure portion 104 and a second enclosure portion 106, such as a cable container, a fiber management tray, or a cable positioner. The first and second enclosure portions may be movably connected (e.g., pivotably, slidably, etc.) such that those portions move between a closed position in which the first and second enclosure portions are adjacent to each other to at least partially define an enclosure therebetween, and an open position in which the first and second enclosure portions are spaced from each other relative to the closed position. In other examples, structure(s) 102 do not partially or fully define one or more enclosures, which may be referred to as non-enclosure structures or non-enclosure portions. Securing device 10 is attached to container 103 via fasteners 108 (e.g., bolts and washers, etc.) that are received in holes 26 of base 12. Additionally, container 103 may include a connector 110 that is partially received in cavity 22 along bottom surface 24 of base 12.

The securing devices of the present disclosure provide a user with the ability to secure one or more structures to a wide range of gauges of cables (e.g., 0.3 inches to 0.75 inches in diameter) using only simple handheld tools. Other advantages of the present disclosure include symmetrical mounting about the cables of varying diameters to ensure the structures remain centered about the cable and reduced time required for a technician to be in proximity to powered cables.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A securing device, comprising:
   (a) a base having a first channel;
   (b) a pair of clamp members retained by the first channel; and
   (c) an actuator member that is retained by the first channel and configured to selectively simultaneously move the pair of clamp members toward or away from each other;
   (d) where said actuator includes a centrally positioned spacer relative to the length of said actuator that surrounds said actuator and extends proud of said actuator, where said actuator is inhibited from said simultaneously moving the pair of clamp members toward each other by said centrally positioned spacer.

2. The device of claim 1, wherein the actuator member is a shaft having a first threaded portion with right-handed threads and a second threaded portion with left-handed threads.

3. The device of claim 2, wherein the pair of clamp members includes a first clamp member having a first opening that includes threads that correspond to the right-handed threads, and a second clamp member having a second opening that includes threads that correspond to the left-handed threads such that rotation of the shaft in a first direction moves the first and second clamp members toward each other and rotation of the shaft in a second direction opposite the first direction moves the first and second clamp members away from each other.

4. The device of claim 2, wherein the shaft includes opposed first and second end portions, the first and second threaded portions being disposed between the first and second end portions, and the first end portion having a hex shape.

5. The device of claim 4, wherein the shaft defines a longitudinal axis and the second end portion includes a first aperture having an axis perpendicular to the longitudinal axis, and further comprising a retaining pin received in the first aperture.

6. The device of claim 5, further comprising a first collar having a first central opening with a first central axis and opposed first and second side openings having axes that are perpendicular to the first central axis, the second end portion of the shaft being received in the first central opening and the pin being received in the first aperture of the second end portion and the first and second side openings of the collar.

7. The device of claim 1, wherein the base includes a second channel disposed perpendicular to and in fluid communication with the first channel.

8. The device of claim 7, wherein the actuator member is a shaft that defines a longitudinal axis, the shaft including a second aperture having an axis that is perpendicular to the longitudinal axis.

9. The device of claim 8, wherein the shaft includes first and second threaded portions and the second aperture is disposed between the first and second threaded portions.

10. The device of claim 9, further comprising a pin received in the second channel and the second aperture of the shaft.

11. The device of claim 10, further comprising a second collar received in the second channel, the second collar having a second central opening with a second central axis and opposed third and fourth side openings having axes that are perpendicular to the second central axis, the shaft being received in the second central opening and the pin being received in the second aperture of the shaft and the third and fourth side openings of the second collar.

12. The device of claim 1, wherein each clamp member of the pair of clamp members includes at least one clamping surface having a plurality of ridges.

13. The device of claim 1, wherein each clamp member of the pair of clamp members includes opposed inclined clamping surfaces each having a plurality of ridges.

14. The device of claim 1, wherein the base includes at least one hole separate from the first channel.

15. The device of claim 14, wherein the at least one hole has an axis that is perpendicular to a longitudinal axis of the first channel.

16. The device of claim 15, wherein the at least one hole is a countersunk hole.

17. A container, comprising:
(a) a first enclosure portion;
(b) a second enclosure portion movably connected to the first enclosure portion, the first and second enclosure portions forming an enclosure therebetween when the second enclosure portion is in a closed position; and
(c) a securing device attached to one of the first or second enclosure portion, wherein the securing device includes:
(1) a base having a first channel;
(2) a pair of clamp members retained by the first channel; and
(3) an actuator member that is retained by the first channel and configured to selectively simultaneously move the pair of clamp members toward or away from each other.

18. The container of claim 17, wherein the base includes at least one hole and further comprising at least one bolt received in the at least one hole attaching the securing device to the first or second enclosure portion.

* * * * *